July 24, 1951 M. G. REESE 2,561,949
MEANS FOR SEQUENTIALLY CONTROLLING THE THROTTLE, CLUTCH, AND
REVERSE DRIVE MECHANISM OF INTERNAL-COMBUSTION MOTORS
Filed July 10, 1948 2 Sheets-Sheet 1
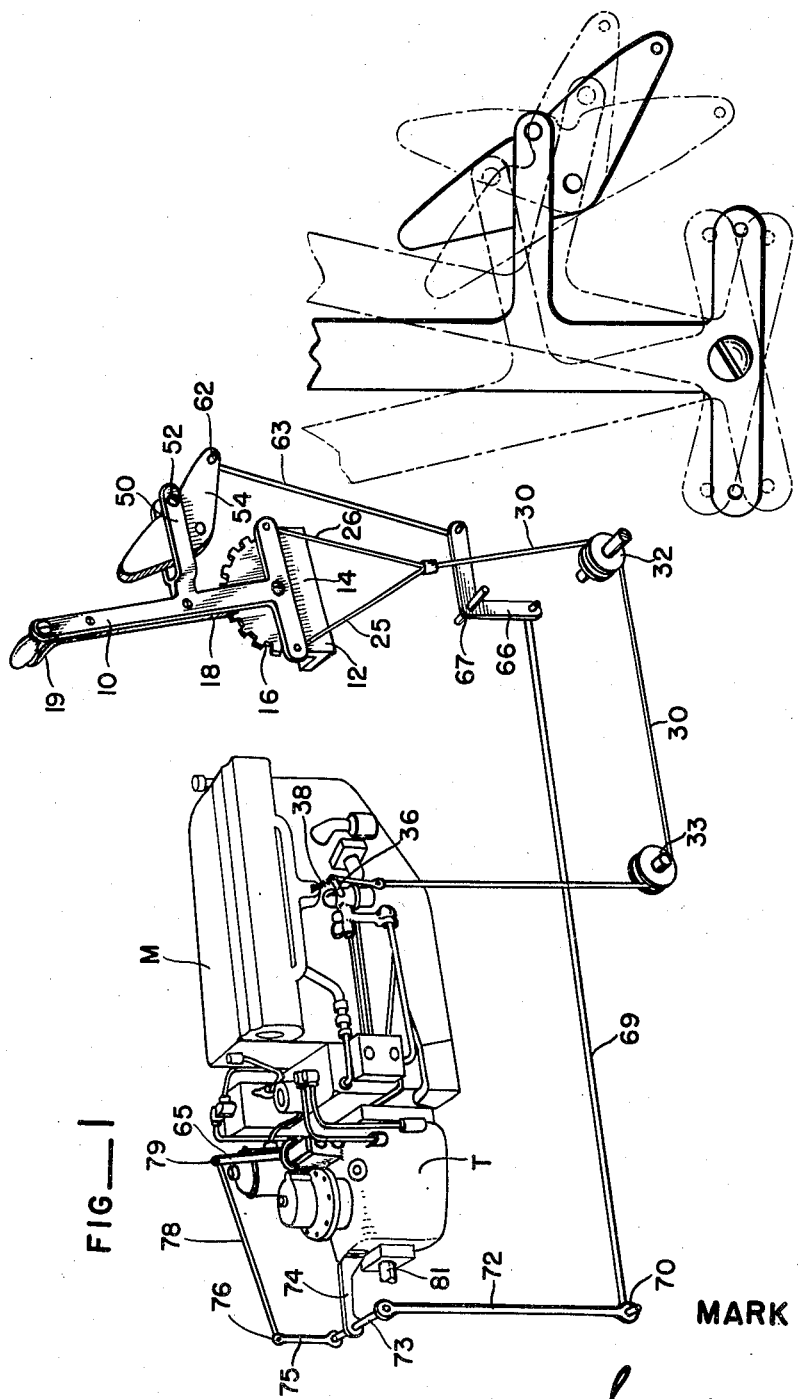
MARK G. REESE
Inventor
By Smith & Tuck
Attorneys July 24, 1951 M. G. REESE 2,561,949
MEANS FOR SEQUENTIALLY CONTROLLING THE THROTTLE, CLUTCH, AND
REVERSE DRIVE MECHANISM OF INTERNAL-COMBUSTION MOTORS
Filed July 10, 1948 2 Sheets-Sheet 2
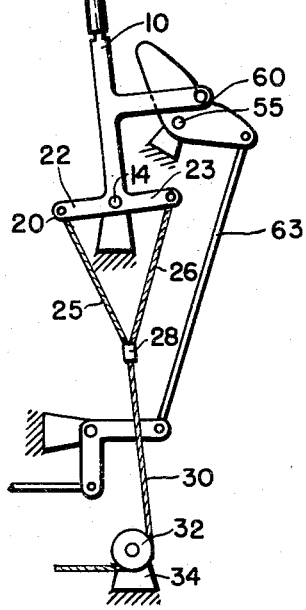
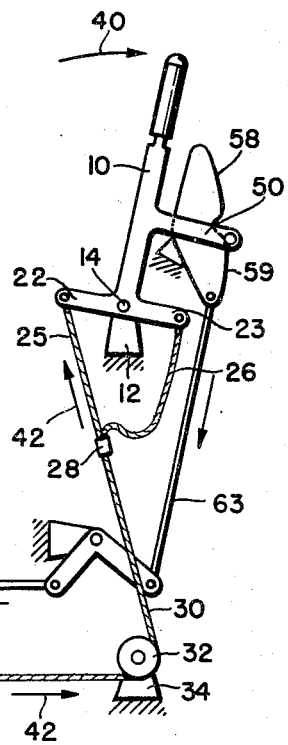
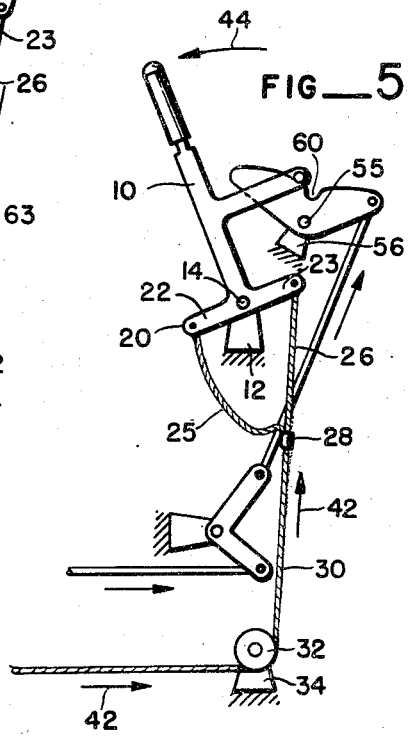
MARK G. REESE
Inventor
By Smitt & Tuck
Attorneys Patented July 24, 1951

2,561,949

UNITED STATES PATENT OFFICE 2,561,949

MEANS FOR SEQUENTIALLY CONTROLLING THE THROTTLE, CLUTCH, AND REVERSE DRIVE MECHANISM OF AN INTERNAL-COMBUSTION MOTOR

Mark G. Reese, Bellevue, Wash., assignor to Hydraulic Supply Manufacturing Co., Seattle, Wash.

Application July 10, 1948, Serial No. 38,094

3 Claims. (Cl. 192—.096)

My present invention relates to the general class of mechanisms which are intended to control the application of power from a prime mover to the work to be done and, more particularly, my invention relates to means for sequentially controlling the throttle, clutch and reverse drive mechanism of an internal combustion motor.

In the use of internal combustion engines as a prime source of power, it has been found that there are certain shortcomings of this type of power plant over power plants operated by steam or electricity. This is particularly noticed in the starting and stopping of the application of power. Steam is probably the most ideal, in that a load can be engaged with the minimum of shock. The same is true with properly controlled electric propulsion units. The internal combustion engine is naturally limited by virtue of the fact that it only produces usable amounts of power when the rotation of the engine is in the working range of its design.

It has been found, by drivers of automobiles for instance, that until skill has been acquired in the shifting of gears and the engagement of the clutch in relation to the throttle position, that there is severe danger of either applying undesirable force to the car transmission or to have the engine turning at such a speed that it cannot carry the load to which it is subjected. This recognized shortcoming of the internal combustion engine has led to the adoption in the automotive field, particularly, of a wide variety of coupling units and of ingenious but complicated transmission devices which have for their purpose the cushioning of the application of power from the internal combustion engine.

There are many industrial uses where it is desirable to use internal combustion engines and where it is further desired, through suitable gearing, that the power be applied to turn the power shaft first in one direction and then in the reverse of that direction. Such applications are necessary in many industrial uses, such as for instance, in hoisting, in the handling of excavation machinery, and in the marine field. In each of these cases, it is normally not convenient or possible to have the ideal arrangement that we have in an automobile for instance, where an operator is sitting for hours in the same position and has available both feet and both hands for the manipulation of the control means.

With my present means, I make it possible for an operator to fully control an internal combustion engine through this range of power application, all with the use of a single lever. Assuming a power plant is driving its output shaft in one direction, a full movemeent of the lever in sequence will reduce the throttle opening of the engine so that it will lose its high rotative speed. The clutching means is then disengaged, bringing the transmission mechanism into a neutral position with the motor running at idling throttle opening, then increase slightly the throttle opening and next re-engage the transmission mechanism in such a manner as to produce rotation in a reverse direction; then a continuation of the movement of the lever will give the necessary throttle opening so as to properly achieve the work problem at hand.

The principal object of my present invention, therefore, is to provide a control means for an industrial or marine power plant, which will assure the proper setting of the throttle of the power plant as the lever is moved through the various positions of engaging and disengaging the power output shaft.

A further object of my present invention is to provide, in a single lever, means for successively reducing the throttle opening of a motor, bringing the power transmission mechanism into the neutral position, then to engage the power transmission in a reverse output position and to increase the throttle opening compatible with the load requirements.

A further object of my present invention is to provide a single lever which will, in proper sequence, operate separately the throttling of an internal combustion engine and the engagement or disengagement of the power transmission means.

A further object of my invention is to provide, in a single lever, means for operating a forward and reverse power transmission, and at the same time, at proper intervals, to control the throttle of the internal combustion engine as is required for smooth operation of the transmission means.

Further objects, advantages and capabilities will be apparent from the description and disclosure in the drawings, or may be comprehended or are inherent in the device.

In the drawings:

Fig. 1 is a perspective view showing my control means as applied to an internal combustion engine having a forward and reverse transmission gearing arrangement.

Fig. 2 is a fragmentary view showing the range of positions of the main lever and the positioning of the control means which this change in lever position entails.

Fig. 3 shows in diagrammatic form the position of my control lever and the associated parts at rest in the neutral position.

Fig. 4 illustrates the same parts as Fig. 3 but shows them in the position they would assume with the transmission engaged to turn the same as the motor.

Fig. 5 is a view of the same part of Fig. 3, but shows the arrangement when the change direction gearing is engaged.

Referring more particularly to the disclosure in the drawings, the numeral 10 designates the control lever of my mechanism. This lever is pivoted to a fixed bracket 12, as at 14. Some form of adjusting means that will hold the lever in its adjusted position is desirable. In Fig. 1, I have illustrated this as a toothed quadrant 16 which is engageable by a retractible pawl member 18, controlled in turn by a finger lever or extension 19. In this manner, the desired position of lever 10 may be assured, the number of teeth or style of securing means being, to a large degree, dictated by the use to which my power plant is to be put. It will be apparent, it is believed, that a friction-securing means would have possibly greater latitude of fine adjustment. Disposed substantially at right angles to the body of lever 10 is the throttle bar 20. This bar extends normally an equal distance on each side of pivot 14 so as to provide the two throttle actuating legs 22 and 23. It will be understood that it is not essential that throttle bar be at right angles to lever 10, if the final result, which will be more fully explained later, can be achieved by other more convenient arrangements.

Secured in an operative manner to the outer end of legs 22 and 23 are throttle operating tension members 25 and 26 which normally are of equal length and are joined as at 28 to the single tension member 30. Tension member 30 passes over suitable guiding sheaves as 32 and 33, which are mounted on fixed mounts as 34 and connect to the throttle control lever 36.

The tension member for the throttle control may be any suitable flexible member, such as a flexible stranded metal cable, a linked chain, or even a suitable cord which preferably should be treated so that it will not change its length under influence of changing conditions of humidity. In order that a tension member may be used to operate the throttle control 36, it is necessary that we have, as counter to this tension member, a tension spring 38, which will at all times operate in the opposite sense from the tension member and thus, as slack is given to the tension member, the spring will take over and move the throttle control means in the desired direction.

Reference is now made to Figs. 3, 4, and 5. In Fig. 3, it will be noted that equal strain is imposed upon the tension members 25 and 26, and in this position, the throttling means on the engine should be adjusted for the minimum throttle position, which is normally that position at which the engine can be expected to idle, without load, for a considerable period of time without stopping. In Fig. 4, I have illustrated lever 10 as moved to the right, or in the direction of the arrow 40. Throughout my drawings I have assumed that this position would produce a rotation in the power output shaft in the same direction as the engine is turning, and in this instance, Fig. 4 may be considered as the forward drive position. In analyzing the action as illustrated in Fig. 4, it is to be noted that, due to the rotation of lever 10, leg 22 has been raised, thus putting a strain on member 25, and in turn moving the tension member 30 in the direction of arrow 42. It is further to be noted that member 26 is now slack, or in the inoperative position.

Referring specifically to Fig. 5, I have shown the operating or control lever 10 moved to the left in the direction of arrow 44. This causes reversal of the throttle bar 22 position. In this instance, the tension member 26 is moved upwardly, due to the upward positioning of leg 23 and again the control cable 30 is moved as indicated by the arrows 42. Thus it will be noted that moving lever 10 in either the forward or reverse position, as shown respectively in Figs. 4 and 5, has the same end result movement of cable 30. This will be more fully explained under operation of the entire unit.

Fixedly secured to lever 10, and outwardly extending from it, is the transmission operating arm 50. This arm may be variously constructed. However, the form shown in Fig. 1, in which arm 50 is made of two members to provide a fork, has been found generally most satisfactory. At the end of fork 50 I provide the through-bolt 52 upon which is preferably disposed a shell roller so as to reduce friction to a minimum.

Disposed in a plane parallel to the plane of movement of arm 50 is the transmission operating cam 54. Cam 54 is pivoted on a fixed pivot at 55, which pivot is suitably supported by a fixed bracket 56. Pivot 55 and its supporting bracket 56, must be so arranged that they will not interfere with the free movement of arm 50 as it must, in one position, normally pass over this pivot. Cam 54 is provided with the two cam surfaces 58 and 59 and the neutral position notch 60.

Pivotably secured to one end of cam 54 as at 62, is an operating rod 63. This rod must be of sufficient rigidity to accept both tension and compressive forces, as in one position it acts in tension and in the opposite position it must transmit its force in compression. The purpose of moving operating rod 63 is to cause the end result of operating the transmission control lever 65. Intermediate lever 65 and the operating rod 63 may be any suitable linkage which will transmit the operating force imparted to it by the actuation of cam 54. Various installations will require different arrangements of this mechanism. It is even conceivable that for certain involved installations it might be convenient to have rod 63 actuate a rotary shaft or to operate the compression piston of a fluid transmission line. Such arrangements are well within the skill of the average mechanic making such an installation and normally must be adapted to the particular conditions at hand. In my showing, as in Fig. 1, I have illustrated operating rod 63 working through the bell crank 66, bell crank 66 being mounted for rotation on a fixed pivot 67. Operatively engaging bell crank 66 is a rod 69 which in turn is connected, as at pivot 70, to lever 72, which is fixedly secured to the rotatable shaft 73. Shaft 73 is suitably journalled in bearing member 74 and has secured to it in turn a lever 75. Lever 75 has pivotably secured as at 76, the rod 78 which, being pivotably secured to lever 65 at 79, will effectively transmit to lever 65 any force, in either diretcion, as applied to operating rod 63 by means of cam 54.

*Method of operation*

It may be assumed that my present equipment, as shown in Fig. 1, is installed in a power boat and that shaft 81 is operatively connected to a screw propeller. In such operation, the prime mover or power plant M will be started by the usual means, with my control mechanism in the neutral position shown in Figs. 1 and 3. As soon as the motor is started, it will come to its idling speed by virtue of the fact that the throttle bar 20 is in its neutral position so that minimum throttle is achieved. The motor should continue to function at this speed, due to the fact that in this arrangement cam 54 is also in a neutral position, so that the transmission mechanism T is in its neutral position and the motor M is not required to deliver power thereto.

If it is now assumed that the operator of the vehicle or boat desires to go ahead, lever 10 is moved to the forward position, following the showing of Fig. 4. The first action on moving lever 10 will be for bolt 52 and its associated roller to move out of the neutral notch 60 and engage the cam surface 59, thus rocking cam 54 about its fixed pivot 55. This action will press downwardly on the operating rod 63 and, through the linkage provided, will cause a forward movement in lever 65, which will engage the transmission mechanism 10 in a manner to propel the shaft 83 in the same direction of rotation as motor M. Upon this action, it will be noted that the two tension members 25 and 26 will now shift in their positions from that shown in Fig. 3 to that shown in Fig. 4, and the tension thus given in the direction of arrows 42 to the main tension member 30 will begin to open the throttle so that the motor M will pick up in its speed and naturally in its power output. It is to be observed that once cam 54 has been tipped and lever 65 moved to the engaged position that no further movement of this lever can be effected. Consequently, the cam surface 59 is so arranged that no further movement is imparted to operating rod 63, as lever 10 is further advanced into the forward position. The further advancing of this lever, however, does continue to move the throttle controlling member 30, so that the operator may, by advancing the same to the desired position, increase the revolutions of the motor and its power output to that which serves his purpose. At this point, the lever 10, through either the mechanism shown in Fig. 1 or some substitute equivalent mechanism, may be secured in this position.

If, after operating in a forward position for a period, it becomes necessary to reverse the direction of rotation of shaft 81, it is achieved by pulling backwardly or to the left as viewed, on lever 10. This passes through the position of Fig. 3, in which lever 65 is moved to disengage the transmission and the throttling of the motor has been reduced to its idling speed; therefore, there is no racing of the motor at this point. A continued movement of lever 10 to the left results in the position shown finally in Fig. 5, wherein bolt 52 has engaged cam surface 58 of cam 54, and through the necessary linkage as shown, has moved lever 65 to the rear position, where the transmission has been suitably engaged to produce a reverse rotation in shaft 81. This engagement of the transmission has been effected while the motor has had its throttle in the throttling or idling position. As lever 10 is moved further to the left, or rear, the operator then begins to apply additional movement to the tension member 30 and thus opens his throttle and gives the motor the desired rotative speed and power output, in the reverse direction, as shown by the output shaft 81.

It is believed that it will be clearly apparent from the above description and the disclosure in the drawings that the invention comprehends a novel construction of a means for sequentially controlling the throttle and clutch of a motor.

Having thus described my invention, I claim:

1. In a sequential control mechanism for engaging the power output of a prime mover in either a forward or reverse direction, the combination of: a control lever; a fixed pivot for said control lever; a throttle bar secured to said control lever; a reversing cam having a cam surface with forward and reverse cam portions and a neutral position notch therebetween; a fixed pivot for said reversing cam; a bifurcated transmission operating arm secured to said control lever and extending outwardly and having engaging means at its outer end closing the bifurcation; said reversing cam being positioned in said bifurcation with said cam surface in position to be engaged by said engaging means; a clutch and reverse mechanism; an operating means for said clutch and reverse mechanism; means capable of transmitting pushing and pulling forces connecting said reversing cam to said clutch and reverse mechanism operating means to transmit motion therebetween; a throttle control member; means normally urging said throttle control member to an idling position; flexible tension means having a divided end attached to said throttle bar in a manner so that said flexible tension means is tensed as said engaging means moves from said neutral notch to said forward and reverse cam portions.

2. In a sequential control mechanism for engaging power output of a prime mover in either a forward or reverse direction, the combination, comprising: a control lever; a fixed pivot for said control lever; a throttle bar secured to said control lever; a reversing cam having a cam surface with forward and reverse cam portions and a neutral notch therebetween; a fixed pivot for said reversing cam; a transmission operating arm secured to said control lever and extending outward and having an engaging member at its outer end; said reversing cam being positioned with said cam surface faced away from said control lever and in position to be engaged by said engaging member; a clutch and reverse mechanism; operating means for said clutch and reverse mechanism; means capable of transmitting pushing and pullling forces connecting said operating means and said reversing cam to transmit motion therebetween; a throttle control member; means normally urging said throttle control member to an idling position; flexible tension means connected to said throttle control member and having a divided end attached to said throttle bar in a manner so that said flexible tension means is tensed as said engaging member moves from said neutral notch to said forward and reverse cam portions.

3. In a sequential control mechanism for engaging the power output of a prime mover in either a forward or reverse direction, the combination, comprising: a control lever; a fixed pivot for said control lever; a throttle bar secured to said control lever; a reversing cam in the form of double wings with the top of one wing forming a forward cam portion and the top of the other wing forming a reverse cam portion and said wings joining in a neutral notch; a fixed pivot for said reversing cam positioned oppositely to said neutral notch; a transmission operating arm secured to said control lever and extending outward and having a bifurcation and an engaging member at its outer end closing said bifurcation; said reversing cam being positioned in said bifurcation with said cam portion faced away from said control lever and in position to be engaged by said engaging member; a clutch and reverse mechanism; operating means for said clutch and reverse mechanism; means capable of transmitting pushing and pulling forces connecting said operating means and said reversing cam to transmit motion therebetween; a throttle control member; spring means normally urging said throttle control member to an idling position; flexible tension means connected to said throttle control member and having a divided end attached to said throttle bar in a manner so that said flexible tension means is progressively tensed as said engaging member mover from said neutral notch to said forward and reverse cam portions.

MARK G. REESE.

REFERENCES CITED

The following references are of record in the file of this patent:

UNITED STATES PATENTS

| Number | Name | Date |
| --- | --- | --- |
| 398,152 | Hardie | Feb. 19, 1889 |
| 1,955,845 | Bush | Apr. 24, 1934 |
| 2,254,144 | Higgins | Aug. 26, 1941 |
| 2,411,463 | Pozgay | Nov. 19, 1946 |
| 2,433,235 | Panish | Dec. 23, 1947 |